Sept. 17, 1935. A. H. EMERSON 2,015,007
MANUFACTURE OF LENSES AND GLASSES
Filed April 26, 1934
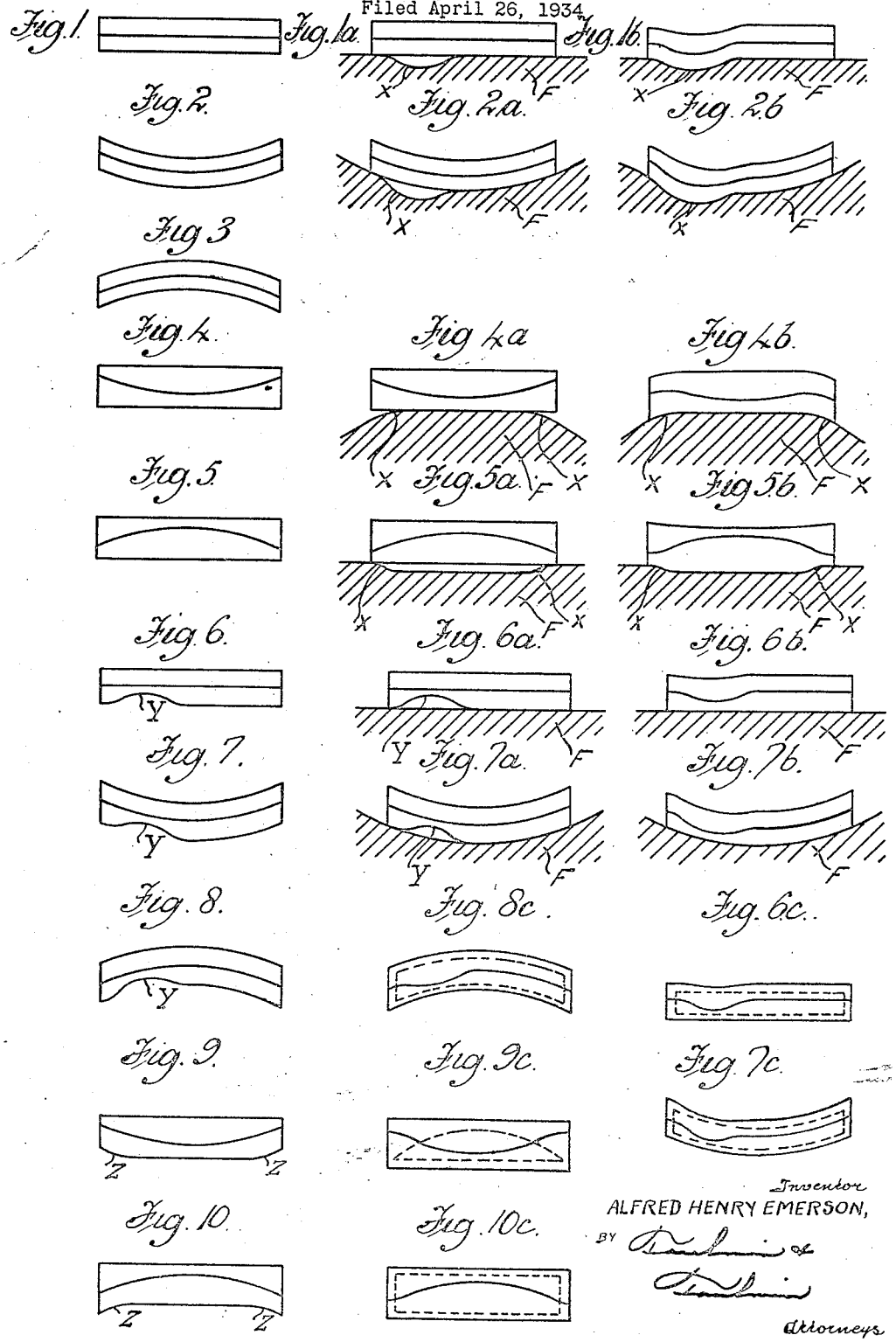
Inventor
ALFRED HENRY EMERSON,
BY
Attorneys Patented Sept. 17, 1935

2,015,007

UNITED STATES PATENT OFFICE 2,015,007

MANUFACTURE OF LENSES AND GLASSES

Alfred Henry Emerson, Finchley, London, England, assignor to United Kingdom Optical Company, Limited, London, England Application April 26, 1934, Serial No. 722,545
In Great Britain April 4, 1933

5 Claims. (Cl. 49—82.1)

This invention relates to the manufacture of lenses and glasses and it involves a method which is commonly referred to as "dropping".

The "dropping" method of forming lenses consists in the use of a former or mould of suitable shape, over which the lens shape for example two sheets of glass with flat parallel surfaces, is placed and into which the lens is then allowed to drop when suitably heated.

Broadly stated, my invention consists in utilizing the method known as "dropping" for dropping a portion only of the lens or glass blank or for dropping the whole of it irregularly.

It is well known that glass discs or plates may be reheated and "bent" or "dropped" to conform to a former so as to have curvatures which are often too expensive to obtain by grinding or hot pressing.

The main object of this invention is to provide a method of dropping lens blanks which will enable alterations or corrections in the power of the lens in different zones or variations in one meridian only to be effected notwithstanding that the outside faces of the lenses are finished with regular surfaces either truly spherical, cylindrical or toric surfaces such as are ordinarily employed in lens work.

To obtain the necessary correction or a gradual alteration in the power of the lens mainly in one meridian or towards one edge, I usually cause only a part of the blank to drop.

In the case of a correction for spherical aberration I cause the lens blank to bend in zones near to the edge. Whilst for a gradual variation in power in one meridian such as for a multifocal lens I cause the lens blank to bend a gradually increasing amount in one direction only.

The invention is mainly intended to be applied to a compound lens blank prepared by fusing together two pieces of glass of different refractive index the contacting surfaces of which will usually be optically worked, a process well known in the trade.

The compound lens blank is placed on a former or other dropping tool after the under surface of the blank has been made quite true, care being taken to ensure that the blank is centrally mounted on the former.

In one method the former which, it will be understood possesses the same shape or contour as the lens blank undergoing manufacture, has a part only of its lens receiving surface modified so as to produce in the lens blank, after dropping, the desired alteration or correction. Thus the former which, for a plane lens blank has a uniformly flat surface and for a concave-convex (or vice versa) lens blank a uniformly spherical surface, is prepared with the necessary departure from the strictly spherical or flat. For this purpose it may have a different radius of curvature in different zones or be given a changing curvature in one plane only across the former so that the change in the power of the dropped lens is towards one side only.

In the alternative method, I employ a former having a regular lens receiving surface, that is uniform in its entirety and instead modify the under surface of the lens blank to a surface, which is the opposite or substantially the opposite of the correction or alteration it is desired to make in the contact surface of the lens so that after the blank has been dropped to the regular surface of the former, it will possess the desired correction.

It will be appreciated that a lens blank produced by either one of the above methods, can be finished without difficulty and by using the ordinary tools and methods as commonly employed by optical lens manufacturers.

The invention can also be applied to the manufacture of coloured glasses usually referred to in the trade as "lenses" although they have no power where it is desired to produce a varying intensity or change of colour.

According to a further feature of the invention therefore I select two pieces of glass substantially alike in refractive index but of different or varying intensity of colour so that after dropping by either of the methods described above and grinding and polishing the surfaces, a lens varying in colour at the edge or towards one edge will be obtained.

The invention will be better understood by reference to the accompanying drawing which is a diagrammatic view illustrating applications of the methods of this invention to the manufacture of various types of lenses.

Figures 1–5 are views of five prepared compound discs ready for dropping in accordance with the first described method of this invention in which the surface of the former is modified. Each figure shows two discs of glass of different refractive index, the lower disc having a lower refractive index than the upper one and/or having a higher melting point. The two discs are fused together in the ordinary manner.

Figures 1–3 illustrate respectively a flat, convex concave and concave convex lens blank for use in the manufacture of a multifocal lens, that is a lens having an infinitely variable focus.

Figure 4 illustrates a lens blank suitable for use in the manufacture of light weight lens, e. g., a cataract lens.

Figure 5 illustrates a lens blank for use in the manufacture of an objective lens.

Figures 1a, 1b, 2a, 2b, 4a, 4b, 5a, 5b, show the lens blanks of Figures 1, 2, 4 and 5 before and after dropping respectively.

In each figure F indicates the former, the surface of which is modified at X in order to produce the necessary correction or alteration in the lens. Thus referring to Figures 1, 1a and 1b, the lens blank is placed upon the former F and subjected to heat so as to cause it to drop on that part opposite the modified portion X. In heating, that portion of the lens opposite the modified portion X, which in this case is a depression, will drop into the depression with the result that the contacting surfaces of the two discs forming the blank will become distorted as shown in Figure 1b. After dropping it is a relatively simple matter to finish the lens in the usual manner, since it only requires finishing to regular surfaces, the correction or alteration in power being dependent upon the distortion of the contacting surfaces, which has the effect of producing a relative displacement of the different glasses of which the blanks consist, as can be seen from Figures 6c–10c.

In the case of a coloured lens or glass exactly the same procedure applies. Two plates of glass as shown in Figure 1a of different colour are selected. The dropping of the composite glass blank so formed produces a redistribution of the relative proportions of the differently coloured glasses at that point of the blank where it is dropped thereby increasing the intensity of one of the colours at this point. In this manner it is possible to vary the intensity of colour towards one edge or by dropping the blank in the manner shown in Figure 4b around the edge.

Figures 6–10 inclusive show a series of blanks corresponding to those illustrated in Figures 1–5 for dropping by the alternative method described above. In this case it is the contact surface of the lens blank which is modified for a part only of its surface as indicated at Y in Figures 6 to 8 or in the marginal zone as indicated at Z, Figures 9 and 10.

Figures 6a, 6b, 7a, 7b, show the lens blanks of Figures 6 and 7 respectively before and after dropping.

It will be noted that in this method the surface of the former is uniform all over.

Figures 6c to 10c inclusive illustrate the lens blanks of Figures 6–10 after dropping, the dotted lines representing the lenses after finishing.

It will be understood that the step of fusing together the discs forming the compound lens blank illustrated in Figures 1–10 may be combined with and form a part of the dropping operation simply by raising the temperature higher than required for fusing only.

What I claim is:—

1. A method of making a variable focus lens comprising surfacing one side of each of two plates of glass having different refractive indices with a smooth continuously-curved surface extending over and surrounding the proposed variable focus area, superimposing said plates with said surfaces in contact with one another, uniting said plates by applying heat thereto, and applying heat to drop a portion thereof along a contacting surface having a variable radius of curvature in different parts of said surface.

2. A method of making a variable focus lens comprising surfacing one side of each of two plates of glass having different refractive indices, said contacting surfaces having substantially corresponding curvatures uniting said plates by applying heat thereto, and applying heat to drop a portion thereof along a contacting surface having a variable radius of curvature in different parts of said surface whereby to produce a visual portion with a variable focal power over its different zones.

3. A method of making a variable focus lens comprising surfacing one side of each of two plates of glass having different refractive indices with a smooth continuously-curved surface extending over and surrounding the proposed variable focus area, superimposing said plates with said surfaces in contact with one another, uniting said plates by applying heat thereto, and applying heat to drop a portion thereof along a contacting surface having a variable radius of curvature in different parts of said surface in one direction only whereby to provide a lens having a visual portion with a gradually-increasing focal power in one direction.

4. A method of making a variable focus lens comprising surfacing one side of each of two plates of glass having different refractive indices with a smooth continuously-curved surface extending over and surrounding the proposed variable focus area, superimposing said plates with said surfaces in contact with one another, forming on the opposite side of one of said plates a concavity having a different radius of curvature in different parts thereof, uniting said plates by applying heat thereto, and applying heat to drop the portion having the concavity thereneath, whereby to transfer the variable radius surface of the concavity to the contacting surface portion between the two plates and provide a lens with a visual portion having variable focal powers.

5. A method of making a variable focus lens comprising preparing a former with a concavity having a variable radius of curvature in different parts thereof, surfacing one side of each of two plates of glass having different refractive indices with a smooth continuously-curved surface extending over and surrounding the proposed variable focus area, superimposing said plates with said surfaces in contact with one another, uniting said plates by applying heat thereto, and applying heat to drop a portion thereof into said concavity whereby to cause the contacting surface therebetween to acquire a variable radius of curvature in different parts thereof whereby to provide a lens having a visual portion of a variable focal power in different parts thereof.

ALFRED HENRY EMERSON.